(12) United States Patent
Lu

(10) Patent No.: US 12,594,707 B2
(45) Date of Patent: Apr. 7, 2026

(54) PVC FLOORING PRODUCTION LINE

(71) Applicant: WUXI BOYU PLASTIC MACHINERY CO., LTD., Wuxi (CN)

(72) Inventor: Dingyi Lu, Wuxi (CN)

(73) Assignee: WUXI BOYU PLASTIC MACHINERY CO., LTD., Wuxi (CN)

( * ) Notice: Subject to any disclaimer, the term of this patent is extended or adjusted under 35 U.S.C. 154(b) by 131 days.

(21) Appl. No.: 18/700,719

(22) PCT Filed: Oct. 10, 2022

(86) PCT No.: PCT/CN2022/124428
§ 371 (c)(1),
(2) Date: Apr. 12, 2024

(87) PCT Pub. No.: WO2023/061335
PCT Pub. Date: Apr. 20, 2023

(65) Prior Publication Data
US 2025/0058509 A1     Feb. 20, 2025

(30) Foreign Application Priority Data

Oct. 14, 2021     (CN) ......................... 202122482616.5

(51) Int. Cl.
*B29C 48/40*          (2019.01)
*B29C 48/00*          (2019.01)
(Continued)

(52) U.S. Cl.
CPC ...... *B29C 48/0021* (2019.02); *B29C 48/0019* (2019.02); *B29C 48/002* (2019.02);
(Continued)

(58) Field of Classification Search
CPC .............. B29C 48/0019; B29C 48/002; B29C 48/0021; B29C 48/0022; B29C 48/022;
(Continued)

(56) References Cited

U.S. PATENT DOCUMENTS

| | | | |
|---|---|---|---|
| 5,947,593 A | 9/1999 | Inoue et al. | |
| 2004/0026824 A1* | 2/2004 | Fujii ................ | B29D 11/00288 264/284 |

(Continued)

FOREIGN PATENT DOCUMENTS

| | | |
|---|---|---|
| CN | 102350746 A | 2/2012 |
| CN | 202146733 U | 2/2012 |

(Continued)

OTHER PUBLICATIONS

English translation of CN110216818. (Year: 2019).*

(Continued)

*Primary Examiner* — Xiao S Zhao
*Assistant Examiner* — Joseph S Leyson
(74) *Attorney, Agent, or Firm* — Bayramoglu Law Offices LLC

(57)          ABSTRACT
A polyvinyl chloride (PVC) flooring production line includes a loading system, an internal-mixing extrusion device, a calendering lamination device, a cooling device, a tractor, and a cutter that are arranged sequentially along a material conveying direction, where the internal-mixing extrusion device includes an internal mixing mechanism, an extrusion mechanism, and a hopper. In an internal mixing stage of the internal-mixing extrusion device, materials are quickly dispersed and plasticized, and plasticized materials directly enter an extruding stage through the hopper for extrusion molding.

7 Claims, 3 Drawing Sheets

(51) Int. Cl.

| | | |
|---|---|---|
| *B29C 48/285* | (2019.01) | |
| *B29C 48/505* | (2019.01) | |
| *B29K 27/06* | (2006.01) | |
| *B29L 31/00* | (2006.01) | |

(52) U.S. Cl.
CPC .......... *B29C 48/022* (2019.02); *B29C 48/286* (2019.02); *B29C 48/40* (2019.02); *B29C 48/505* (2019.02); *B29K 2027/06* (2013.01); *B29L 2031/732* (2013.01)

(58) Field of Classification Search
CPC ......... B29C 48/07; B29C 48/08; B29C 48/21; B29C 48/286; B29C 48/288; B29C 48/305; B29C 48/397; B29C 48/40; B29C 48/49; B29C 48/505; B29C 48/906; B29C 48/9135; B29C 48/914; B29C 48/9155; B29L 2031/732; B29B 7/20; B29B 7/748; B29B 7/7485; B29B 7/7495; B29D 7/00
See application file for complete search history.

(56) References Cited

U.S. PATENT DOCUMENTS

| | | | | |
|---|---|---|---|---|
| 2016/0052171 A1* | 2/2016 | Ogane | ................ | B01F 27/7221 |
| | | | | 366/83 |
| 2020/0173108 A1* | 6/2020 | Zhou | ....................... | B32B 37/06 |

FOREIGN PATENT DOCUMENTS

| | | | | | | |
|---|---|---|---|---|---|---|
| CN | 202155160 | U | | 3/2012 | | |
| CN | 205553494 | U | * | 9/2016 | | |
| CN | 110126117 | A | | 8/2019 | | |
| CN | 110216818 | A | | 9/2019 | | |
| CN | 111016394 | A | * | 4/2020 | ............ | B32B 33/00 |
| CN | 214137425 | U | | 9/2021 | | |
| CN | 216300229 | U | | 4/2022 | | |
| CN | 216329315 | U | | 4/2022 | | |

OTHER PUBLICATIONS

English translation of CN214137425. (Year: 2021).*
English translation of CN102350746. (Year: 2012).*
English translation of CN111016394. (Year: 2020).*
English translation of CN205553494. (Year: 2016).*

* cited by examiner

PVC FLOORING PRODUCTION LINE

CROSS-REFERENCE TO THE RELATED APPLICATIONS

This application is the national phase entry of International Application No. PCT/CN2022/124428, filed on Oct. 10, 2022, which is based upon and claims priority to Chinese Patent Application No. 202122482616.5, filed on Oct. 14, 2021, the entire contents of which are incorporated herein by reference.

TECHNICAL FIELD

The present application relates to the technical field of flooring manufacturing, and in particular to a polyvinyl chloride (PVC) flooring production line.

BACKGROUND

In an extrusion stage of existing PVC flooring production, materials are mixed by a high-speed mixer to about 120° C., discharged to a cooling mixer for cooling, and plasticized forcibly by a conical twin-screw extruder with a good shear force. This process is highly energy-consuming. Specifically, the materials are firstly heated for about 20-40 min, cooled at the high temperature, and discharged to the extruder heated to 190-200° C. In the extruder, the materials are plasticized and extruded into a panel. By heating the materials to 120-135° C. through the high-speed mixer and then cooling the materials to about 50° C. through the cooling mixer, there is a temperature difference of 70-85° C. to cause high energy consumption, long mixing time, and a high mixing cost. Moreover, the materials are only plasticized by means of forced shearing and frictional heating of a screw of the extruder. For a PVC hard product without a plasticizer, a plasticization effect is undesirable.

SUMMARY

The present application is intended to solve at least one of the technical problems in the prior art. In view of this, the present application provides a PVC flooring production line. The present application can lower energy consumption, shorten material mixing and extruding time, reduce a cost, and optimize a plasticization effect, and is applicable to a PVC hard product without a plasticizer.

According to a first aspect of the present application, an embodiment provides a PVC flooring production line, including a loading system, an internal-mixing extrusion device, a calendering lamination device, a cooling device, a tractor, and a cutter that are arranged sequentially along a material conveying direction, where a film unwinding mechanism is provided on a top of the calendering lamination device; a delivery track is provided along the calendering lamination device, the cooling device, the tractor, and the cutter; the internal-mixing extrusion device includes an internal mixing mechanism, an extrusion mechanism, and a hopper; the internal mixing mechanism includes a mixing chamber; the mixing chamber includes a rear end provided with a first feed port, and a front end provided with a first discharge port; a rotor is provided in the mixing chamber along a front-rear direction; the extrusion mechanism is located below the internal mixing mechanism; the extrusion mechanism includes an extruding chamber; the extruding chamber includes a rear end provided with a second feed port, and a front end provided with a mold; a screw is provided in the extruding chamber along the front-rear direction; and the hopper is connected between the first discharge port and the second feed port.

The PVC flooring production line according to the embodiment of the present application at least has the following beneficial effects: In an internal mixing stage of the internal-mixing extrusion device, materials are quickly dispersed and plasticized, and plasticized materials directly enter an extruding stage through the hopper for extrusion molding. The production line provided by the present application achieves a desirable plasticization effect, and prevents the problem that a PVC hard product without a plasticizer is forcibly plasticized by a conventional extruder to cause a poor plasticization effect. Without passing through a high-speed mixer, the plasticized materials are directly extruded. This shortens material mixing and extruding time, lowers energy consumption, and reduces usage amounts of a stabilizer, an internal lubricant and an external lubricant in a material formula. The production line provided by the present application has a high degree of automation, and can realize continuous and efficient production of PVC floorings.

According to some embodiments of the present application, the rotor is a double-kneading structure; the rotor includes a rotor shaft; and a material conveying segment, a first mixing segment, a first helical segment, a second mixing segment, and a first discharge segment are arranged sequentially on the rotor shaft. With the rotor, the materials can be effectively filled in the whole mixing chamber in internal mixing. With a high fill rate and a good dispersity, the rotor is applicable to a temperature-sensitive material, and makes the material plasticized desirably.

According to some embodiments of the present application, a second helical segment is further provided between the second mixing segment and the first discharge segment. The whole rotor is lengthened to facilitate discharge of the materials. Before discharged, the original blocky materials are cut into small bulk materials or large granular materials. This facilitates conveyance of the materials to the extruding chamber, and can further improve the plasticization effect and shorten the time.

According to some embodiments of the present application, the rotor is a single-kneading structure; the rotor includes a rotor shaft; and a material conveying segment, a mixing segment, and a second discharge segment are arranged sequentially on the rotor shaft. The rotor has a strong universality and a good material conveying stability.

According to some embodiments of the present application, a third helical segment is further provided between the mixing segment and the second discharge segment. The whole rotor is lengthened to facilitate discharge of the materials. Before discharged, the original blocky materials are cut into small bulk materials or large granular materials. This facilitates conveyance of the materials to the extruding chamber, and can further improve the plasticization effect and shorten the time.

According to some embodiments of the present application, a forced feeding device is provided in the hopper; the forced feeding device includes two parallel rotating shafts; a blade is provided on each of the rotating shafts; and the two rotating shafts rotate relatively.

According to some embodiments of the present application, the two rotating shafts are respectively driven by a driving gear and a driven gear that are engaged to each other.

According to some embodiments of the present application, the screw refers to conical twin screws, a single screw or parallel twin screws.

According to some embodiments of the present application, the loading system includes a vacuum loader, a loss-in-weight feeder, and a mixing bunker that are connected sequentially; a discharge port of the mixing bunker is provided with a screw batcher; and the discharge port of the mixing bunker is connected to the first feed port. The materials are conveyed to the loss-in-weight feeder through the vacuum loader. The loss-in-weight feeder is used to accurately mix the materials. The mixed materials are temporarily stored in the mixing bunker. The materials are fed by the screw batcher to the internal-mixing extrusion device. The materials directly enter the internal-mixing extrusion device for internal mixing and extrusion, without passing through the high-speed mixer.

According to some embodiments of the present application, the calendering lamination device is one of a three-roll calender, a four-roll calender or a five-roll calender. In combination with calendering and laminating or embossing, the calender can realize thickness fixing and surface effect treatment of a substrate.

According to some embodiments of the present application, the calendering lamination device is a five-roll calender; the five-roll calender includes a thickness fixing roll set, a pre-laminating roll set, and a pressing roll set; the pressing roll set includes an embossing roll; and the embossing roll is provided with a water cooling device. The extruded substrate is calendered through the thickness fixing roll set to obtain a target thickness, and then laminated and embossed by the pre-laminating roll set and the pressing roll set. The five-roll calender can press and form a substrate layer, a printed layer, and a wear layer conveniently and quickly, and can produce a clear and sharp embossed pattern.

According to some embodiments of the present application, the calendering lamination device may further be a calendering lamination line composed of a thickness fixing roll and a plurality of lamination units; the thickness fixing roll is located at a front end of the calendering lamination line; the plurality of lamination units are sequentially connected behind the thickness fixing roll; a number of the lamination units is increased or decreased according to a product requirement; the film unwinding mechanism is located above the lamination units; the lamination units each include a preheating roll, a laminating roll, and a roll table conveyance line for conveying a material; further, the roll table conveyance line may be provided with a preheating system; and further, a tail end of the calendering lamination line is further provided with an embossing roll. The extruded substrate is calendered through the thickness fixing roll. Sequentially passing through the plurality of lamination unit, the substrate is laminated. The laminated substrate passes through the embossing roll at last.

According to some embodiments of the present application, an automatic panel lifter is further provided behind the cutter. The automatic panel lifter is used to stack a cut panel.

According to some embodiments of the present application, there are two or more internal-mixing extrusion devices to form a co-extrusion system. Through a co-extrusion process, an ABA composite flooring and an ABC composite flooring may be obtained.

Additional aspects and advantages of the present application will be partly provided in the following description, and partly become evident in the following description or understood through the practice of the present application.

BRIEF DESCRIPTION OF THE DRAWINGS

The foregoing and/or additional aspects and advantages of the present application will become apparent and readily understood from the descriptions of the embodiments with reference to the following accompanying drawings, in which.

Figure 1:
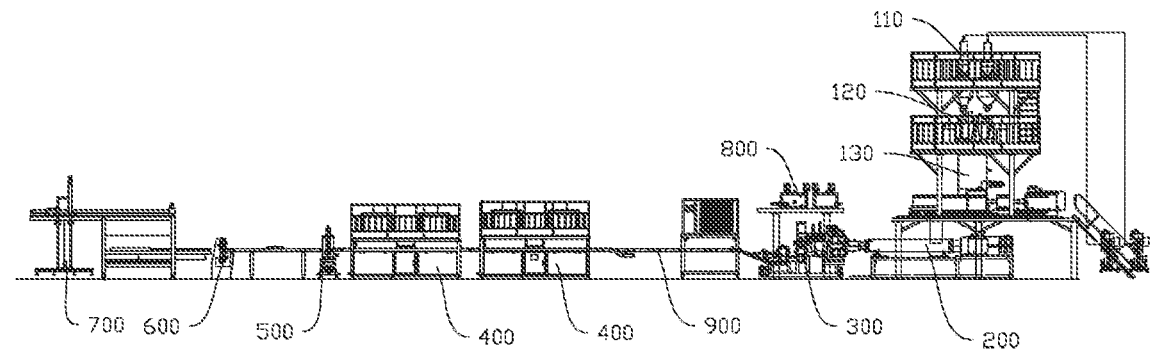
FIG. 1 is a schematic view of an overall structure according to an embodiment of the present application.

In the figures: 110: vacuum loader, 120: loss-in-weight feeder, 130: mixing bunker, 200: internal-mixing extrusion device, 210: internal mixing mechanism, 211: mixing chamber, 212: first feed port, 213: first discharge port, 220: extrusion mechanism, 221: extruding chamber, 222: second feed port, 223: mold, 224: screw, 230: hopper, 231: forced feeding device, 300: five-roll calender, 400: cooling device, 500: tractor, 600: cutter, 700: automatic panel lifter, 800: film unwinding mechanism, 900: delivery track, 1000: rotor, 1010: rotor shaft, 1020: material conveying segment, 1030: first mixing segment, 1040: first helical segment, 1050: second mixing segment, 1060: first discharge segment, 1070: second helical segment, 1080: mixing segment, 1090: second discharge segment, and 1100: third helical segment.

DETAILED DESCRIPTION OF THE EMBODIMENTS

The embodiments of the present application are described below in detail. The embodiments are shown in the drawings. The same or similar numerals represent the same or similar elements or elements having the same or similar functions throughout the specification. The embodiments described below with reference to the drawings are exemplary, and are merely intended to explain the present application, rather than to limit the present application.

Figure 2:
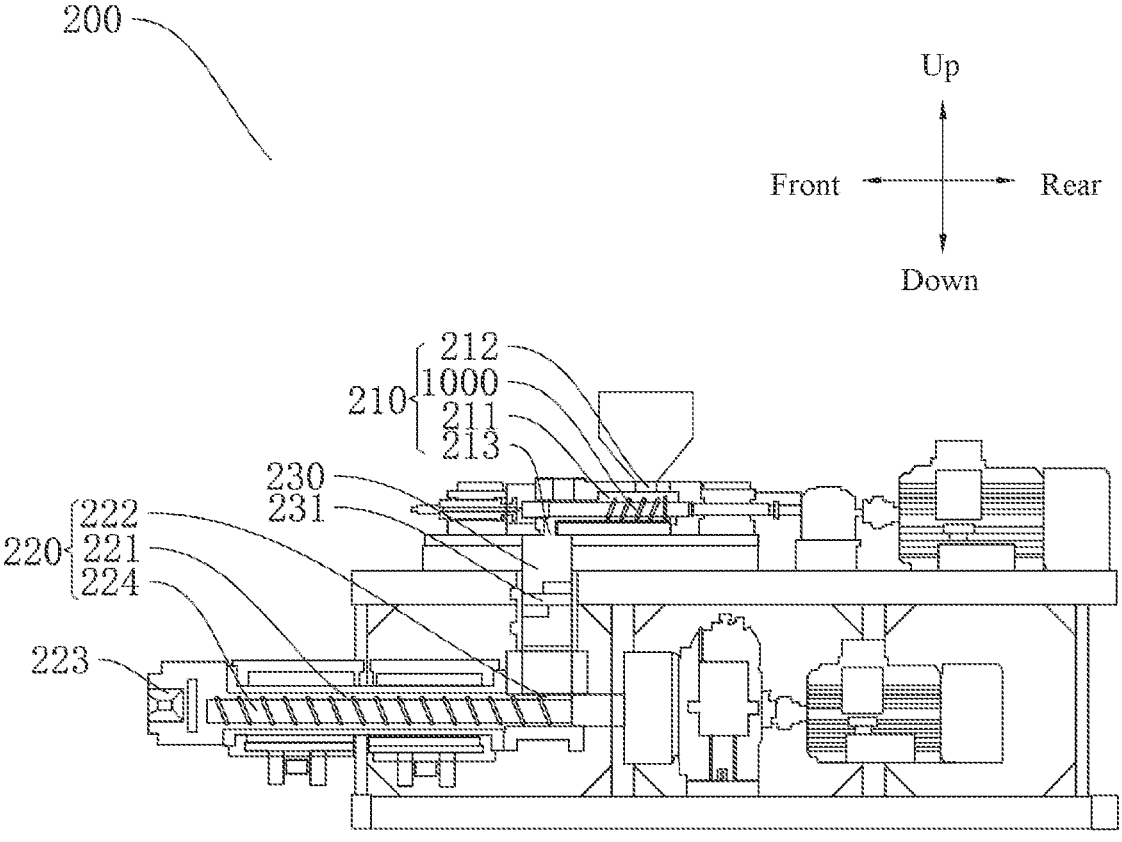
FIG. 2 is a schematic structural view of an internal-mixing extrusion device 200 according to the present application.
Figure 3:
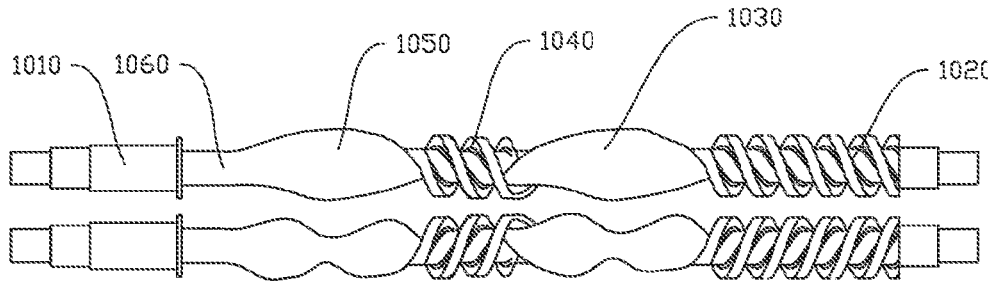
FIG. 3 is a first schematic structural view of a rotor 1000 according to the present application.

Referring to FIGS. 1-2, a PVC flooring production line includes a loading system, internal-mixing extrusion device 200, five-roll calender 300, cooling device 400, tractor 500, cutter 600, and automatic panel lifter 700 that are arranged sequentially along a material conveying direction. Film unwinding mechanism 800 is provided on a top of the five-roll calender 300. Delivery track 900 is provided along the five-roll calender 300, the cooling device 400, the tractor 500, and the cutter 600. The loading system includes vacuum loader 110, loss-in-weight feeder 120, and mixing bunker 130 that are connected sequentially. A discharge port of the mixing bunker 130 is provided with a screw batcher. The discharge port of the mixing bunker 130 is connected to first feed port 212. The internal-mixing extrusion device 200 includes internal mixing mechanism 210, extrusion mechanism 220, and hopper 230. The internal mixing mechanism 210 includes mixing chamber 211. The mixing chamber 211 includes a rear end provided with the first feed port 212, and a front end provided with first discharge port 213. Rotor 1000 is provided in the mixing chamber 211 along a front-rear direction. The extrusion mechanism 220 is located below the internal mixing mechanism 210. The extrusion mechanism 220 includes extruding chamber 221. The extruding chamber 221 includes a rear end provided with second feed port 222, and a front end provided with mold 223. Screw 224 is provided in the extruding chamber 221 along the front-rear direction. The hopper 230 is connected between the first discharge port 213 and the second feed port 222. Forced feeding device 231 is provided in the hopper 230. The forced feeding device 231 includes two parallel rotating shafts. A blade is provided on each of the rotating shafts. The two rotating shafts rotate relatively. The two rotating shafts are respectively driven by a driving gear and a driven gear that are engaged to each other. The five-roll calender 300 includes a thickness fixing roll set, a pre-laminating roll set, and a pressing roll set. The pressing roll set includes an embossing roll. The embossing roll is provided with a water cooling device.

As shown in FIGS. 3-6, a material conveying segment 1020, a first helical segment 1040, a second helical segment 1070, and a third helical segment 1100 each have respective helical windings. In some embodiments, referring to FIG. 3, the rotor 1000 is a double-kneading structure. The rotor 1000 includes rotor shaft 1010. Material conveying segment 1020, first mixing segment 1030, first helical segment 1040, second mixing segment 1050, and first discharge segment 1060 are arranged sequentially on the rotor shaft 1010. With the rotor, the materials can be effectively filled in the whole mixing chamber in internal mixing. With a high fill rate and a good dispersity, the rotor is applicable to a temperature-sensitive material, and makes the material plasticized desirably.

Figure 4:
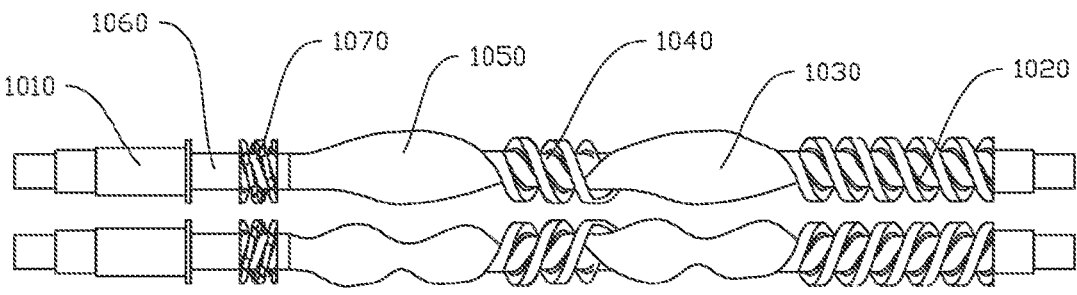
FIG. 4 is a second schematic structural view of a rotor 1000 according to the present application.

In some embodiments, referring to FIG. 4, the rotor 1000 is a double-kneading structure. The rotor 1000 includes rotor shaft 1010. Material conveying segment 1020, first mixing segment 1030, first helical segment 1040, second mixing segment 1050, and first discharge segment 1060 are arranged sequentially on the rotor shaft 1010. Second helical segment 1070 is further provided between the second mixing segment 1050 and the first discharge segment 1060. The whole rotor is lengthened to facilitate discharge of the materials. As shown in FIG. 4, the second helical segment 1070 has a shorter length along the front-rear direction than the material conveying segment 1020 and the first helical segment 1040 and has a shorter distance between helical windings than the material conveying segment 1020 and the first helical segment 1040. Before discharged, the original blocky materials are cut into small bulk materials or large granular materials. This facilitates conveyance of the materials to the extruding chamber, and can further improve the plasticization effect and shorten the time.

Figure 5:
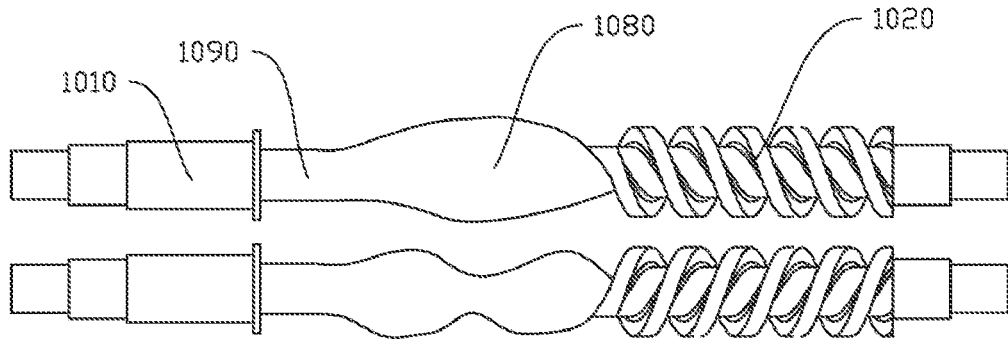
FIG. 5 is a third schematic structural view of a rotor 1000 according to the present application.

In some embodiments, referring to FIG. 5, the rotor 1000 is a single-kneading structure. The rotor 1000 includes rotor shaft 1010. Material conveying segment 1020, mixing segment 1080, and second discharge segment 1090 are arranged sequentially on the rotor shaft 1010. The rotor has a strong universality and a good material conveying stability.

Figure 6:
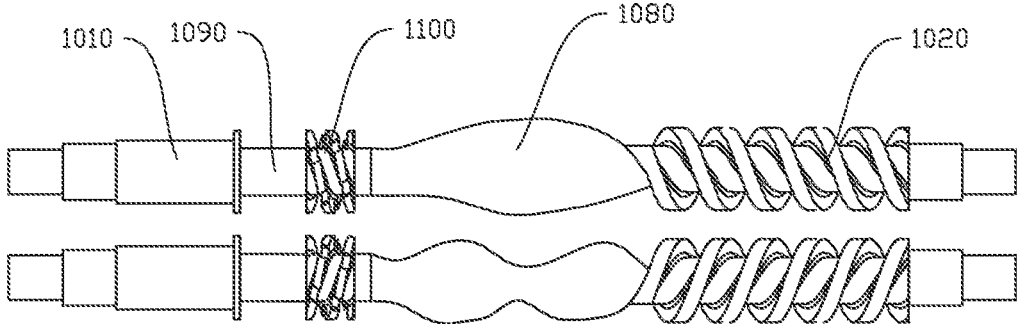
FIG. 6 is a fourth schematic structural view of a rotor 1000 according to the present application.

In some embodiments, referring to FIG. 6, the rotor 1000 is a single-kneading structure. The rotor 1000 includes rotor shaft 1010. Material conveying segment 1020, mixing segment 1080, and second discharge segment 1090 are arranged sequentially on the rotor shaft 1010. Third helical segment 1100 is further provided between the mixing segment 1080 and the second discharge segment 1090. The whole rotor is lengthened to facilitate discharge of the materials. Before discharged, the original blocky materials are cut into small bulk materials or large granular materials. This facilitates conveyance of the materials to the extruding chamber, and can further improve the plasticization effect and shorten the time.

In some embodiments, the screw 224 refers to conical twin screws, a single screw or parallel twin screws.

The embodiments of the present application are described in detail above with reference to the accompanying drawings, but the present application is not limited to the above embodiments. Within the scope of knowledge possessed by those of ordinary skill in the art, various modifications can be made without departing from the purpose of the present application.

What is claimed is:

1. A polyvinyl chloride (PVC) flooring production line, comprising a loading system, an internal-mixing extrusion device, a calendering lamination device, a cooling device, a tractor, and a cutter that are arranged sequentially along a material conveying direction, wherein a film unwinding mechanism is provided on a top of the calendering lamination device;

a delivery track is provided along the calendering lamination device, the cooling device, the tractor, and the cutter;

the internal-mixing extrusion device comprises an internal mixing mechanism, an extrusion mechanism, and a hopper;

the internal mixing mechanism comprises a mixing chamber;

the mixing chamber comprises a rear end provided with a first feed port, and a front end provided with a first discharge port;

a rotor is provided in the mixing chamber along a front-rear direction;

the extrusion mechanism is located below the internal mixing mechanism;

the extrusion mechanism comprises an extruding chamber;

the extruding chamber comprises a rear end provided with a second feed port, and a front end provided with a mold;

a screw is provided in the extruding chamber along the front-rear direction; and the hopper is connected between the first discharge port and the second feed port, wherein the rotor is a double-kneading structure; the rotor comprises a rotor shaft; and a material conveying segment, a first mixing segment, a first helical segment, a second mixing segment, and a first discharge segment are arranged sequentially on the rotor shaft, and wherein a second helical segment is further provided between the second mixing segment and the first discharge segment directly adjacent to the first discharge segment, wherein the second helical segment has a shorter length along the front-rear direction than the material conveying segment and the first helical segment and has a shorter distance between helical windings than the material conveying segment and the first helical segment.

2. The PVC flooring production line according to claim 1, wherein the loading system comprises a vacuum loader, a loss-in-weight feeder, and a mixing bunker that are connected sequentially; a discharge port of the mixing bunker is provided with a screw batcher; and the discharge port of the mixing bunker is connected to the first feed port.

3. The PVC flooring production line according to claim 1, wherein the calendering lamination device is one of a three-roll calender, a four-roll calender or a five-roll calender.

4. The PVC flooring production line according to claim 1, wherein the calendering lamination device is a five-roll calender; the five-roll calender comprises a thickness fixing roll set, a pre-laminating roll set, and a pressing roll set; the pressing roll set comprises an embossing roll; and the embossing roll is provided with a water cooling device.

5. The PVC flooring production line according to claim 1, wherein an automatic panel lifter for stacking a product is further provided behind the cutter.

6. The PVC flooring production line according to claim 1, wherein there are at least two internal-mixing extrusion devices to form a co-extrusion system.

7. The PVC flooring production line according to claim 1, wherein a forced feeding device is provided in the hopper; the forced feeding device comprises two parallel rotating shafts; a blade is provided on each of the two parallel rotating shafts; and the two parallel rotating shafts rotate relatively.

\* \* \* \* \*